(12) United States Patent
Ball

(10) Patent No.: US 12,534,893 B2
(45) Date of Patent: *Jan. 27, 2026

(54) PAUSING HANDSHOWER CRADLE

(71) Applicant: Kohler Co., Kohler, WI (US)

(72) Inventor: Matthew J. Ball, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,235

(22) Filed: Feb. 13, 2024

(65) Prior Publication Data

US 2024/0183136 A1    Jun. 6, 2024

Related U.S. Application Data

(63) Continuation of application No. 17/313,371, filed on May 6, 2021, now Pat. No. 11,913,204, which is a continuation of application No. 16/454,655, filed on Jun. 27, 2019, now Pat. No. 11,028,564.

(60) Provisional application No. 62/691,409, filed on Jun. 28, 2018.

(51) Int. Cl.
*E03C 1/06* (2006.01)
*E03C 1/05* (2006.01)
*E03C 1/02* (2006.01)

(52) U.S. Cl.
CPC ............... *E03C 1/06* (2013.01); *E03C 1/057* (2013.01); *E03C 2001/026* (2013.01)

(58) Field of Classification Search
CPC .. B05B 1/18; B05B 1/185; B05B 1/30; E03C 1/06; E03C 1/066; E03C 2001/026; F16K 11/044–0445
See application file for complete search history.

(56) References Cited

U.S. PATENT DOCUMENTS

| 1,960,724 A | 5/1934 | Bramsen |
| 2,584,943 A | 2/1952 | Thomas |
| 2,767,019 A * | 10/1956 | Manville ............... F16K 11/044 |
| | | 137/614.19 |
| 4,522,232 A | 6/1985 | Ferguson |

(Continued)

FOREIGN PATENT DOCUMENTS

| CN | 101862713 A | 10/2010 |
| CN | 104685136 A | 6/2015 |

(Continued)

OTHER PUBLICATIONS

Final Office Action on U.S. Appl. No. 17/313,371 Dtd Jul. 14, 2023.

(Continued)

*Primary Examiner* — David P Angwin
*Assistant Examiner* — Nicholas A Ros
(74) *Attorney, Agent, or Firm* — Foley & Lardner LLP

(57) ABSTRACT

A handshower cradle assembly includes a waterway body, a handshower cradle, and an actuator. The handshower cradle is coupled to the waterway body. The actuator is configured to reduce a flow rate of water through the waterway body in response to a handshower being received within the handshower cradle. In some embodiments, the handshower cradle is configured to engage with the actuator under the weight of the handshower to adjust a position of the actuator with respect to the waterway body.

18 Claims, 5 Drawing Sheets

(56) References Cited

U.S. PATENT DOCUMENTS

| | | | |
|---|---|---|---|
| 4,735,357 | A | 4/1988 | Gregory et al. |
| 5,232,162 | A | 8/1993 | Chih |
| 5,381,962 | A | 1/1995 | Teague |
| 5,398,872 | A | 3/1995 | Joubran |
| 5,433,384 | A | 7/1995 | Chan |
| 5,868,311 | A | 2/1999 | Cretu-Petra |
| 5,906,319 | A | 5/1999 | Crowl |
| 6,000,626 | A | 12/1999 | Futo et al. |
| 6,065,694 | A * | 5/2000 | d'Alayer de Costemore d'Arc ... B05B 1/30 239/574 |
| 6,173,911 | B1 | 1/2001 | Hui-Chen |
| 6,202,980 | B1 | 3/2001 | Vincent et al. |
| 6,513,787 | B1 | 2/2003 | Jeromson et al. |
| 6,738,996 | B1 | 5/2004 | Malek et al. |
| 6,749,135 | B2 | 6/2004 | Groblebe et al. |
| 7,150,293 | B2 | 12/2006 | Jonte |
| 7,343,930 | B2 | 3/2008 | Rosko |
| 7,871,020 | B2 | 1/2011 | Nelson et al. |
| 8,089,473 | B2 | 1/2012 | Koottungal |
| 8,376,248 | B2 | 2/2013 | Meisner et al. |
| 8,485,796 | B2 | 7/2013 | Gilpatrick |
| 8,572,772 | B2 | 11/2013 | Wolf et al. |
| 8,919,379 | B2 * | 12/2014 | Zhou ............ E03C 1/0408 137/625.48 |
| 9,181,685 | B2 | 11/2015 | Esche et al. |
| 9,347,208 | B2 | 5/2016 | Quinn et al. |
| 9,637,905 | B2 * | 5/2017 | Hauth ............ E03C 1/0408 |
| 10,232,386 | B1 * | 3/2019 | Lu ............ F16K 11/0743 |
| 10,919,056 | B2 | 2/2021 | Luo et al. |
| 11,028,564 | B2 * | 6/2021 | Ball ............ E03C 1/06 |
| 11,090,670 | B2 | 8/2021 | Fan et al. |
| 11,913,204 | B2 * | 2/2024 | Ball ............ E03C 1/0408 |
| 2005/0184203 | A1 | 8/2005 | Votypka |
| 2009/0007330 | A1 | 1/2009 | Genord et al. |
| 2012/0325353 | A1 | 12/2012 | Zhou et al. |
| 2015/0240956 | A1 | 8/2015 | Ramos De Barros |
| 2015/0354192 | A1 | 12/2015 | Hauth |
| 2016/0059242 | A1 | 3/2016 | Bae |

FOREIGN PATENT DOCUMENTS

| | | |
|---|---|---|
| CN | 105189880 | 12/2015 |
| EP | 0 498 193 A1 | 8/1992 |

OTHER PUBLICATIONS

Non-Final Office Action on U.S. Appl. No. 16/454,655 Dtd Aug. 5, 2020.
Non-Final Office Action on U.S. Appl. No. 17/313,371 Dtd Jan. 6, 2023.
Non-Final Office Action on U.S. Appl. No. 17/313,371 Dtd Jun. 27, 2022.
Notice of Allowance on U.S. Appl. No. 16/454,655 Dtd Feb. 10, 2021.
Notice of Allowance on U.S. Appl. No. 17/313,371 Dtd Oct. 19, 2023.
Notification of First Office Action CN Appln No. 201910558213.9; 11 pgs dated Aug. 19, 2020.
Notification of First Office Action CN Appln No. 201910558213.9; dated Aug. 19, 2020 (11 pages).
US Office Action on U.S. Appl. No. 16/454,655 Dtd Nov. 24, 2020.

* cited by examiner

PAUSING HANDSHOWER CRADLE

CROSS-REFERENCE TO RELATED PATENT APPLICATIONS

This application is a continuation of U.S. patent application Ser. No. 17/313,371, filed May 6, 2021, which is a continuation of U.S. patent application Ser. No. 16/454,655, filed Jun. 27, 2019, which claims the benefit of and priority to U.S. Provisional Application No. 62/691,409, filed Jun. 28, 2018, all of which are incorporated herein by reference in their entireties.

BACKGROUND

The present application relates generally to the field of cradles for handshowers or handheld showerheads. More specifically, this application relates to handshower cradles designed to reduce or cease the flow of water out of the handshower upon the handshower being docked in the cradle, and to restore the flow of water when the handshower is removed from the dock.

Handshowers, or handheld showerheads, are commonly used in showering environments to allow users to direct the flow of water to specific areas (e.g., toward their legs). For example, the use of a handshower enables a user to rinse with the handshower while bathing, and place it on a dock or cradle while shaving or lathering (after which the handshower may be used to rinse off the area). However, when the handshower is docked and not being used, most handshowers will continue at a full flow rate, potentially wasting water. Alternatively, some handshowers provide users with the ability to turn a dial or press a button to manually cycle through modes or volumes to an off or low-flow mode while docking it, in order to preserve water. However, such a solution may be cumbersome.

Handshowers are typically configured for mounting within a shower enclosure in a cradle or other structure that receive and secure the handshower when not in use. The flow of water through such handshowers is typically controlled either by an actuator or controller (e.g., a handle, knob, electronic controller, etc.) on the wall of the shower enclosure or elsewhere, or by controls on the handshower itself (e.g., buttons or knobs on the handshower body or handle). In such configurations, the separate flow controllers require additional hardware and potentially more complicated installations. For example, in situations where the controller is a handle provided on a wall of the shower enclosure, the handle must be mounted and connected to the rest of the showering hardware to allow for control of the water flow. In situations where the water flow controllers are incorporated into the handshower itself, the handshower must be designed to accommodate the internal mechanisms necessary to control the water flow.

It would be advantageous to provide an improved handshower system that simplifies the process of controlling the flow of water to the handshower. These and other advantageous features will become apparent to those reviewing the present disclosure.

SUMMARY

One exemplary embodiment relates to a handshower cradle assembly. The handshower cradle assembly includes a waterway body, a handshower cradle, and an actuator. The handshower cradle is coupled to the waterway body. The actuator is configured to reduce a flow rate of water through the waterway body in response to a handshower being received within the handshower cradle. In some embodiments, the handshower cradle is configured to engage with the actuator under the weight of the handshower to adjust a position of the actuator with respect to the waterway body.

Another exemplary embodiment relates to a handshower cradle assembly. The handshower cradle assembly includes a waterway body, an actuator, and a handshower cradle. The waterway body includes a water inlet and a water outlet that is fluidly coupled to the water inlet by a waterway restriction zone that extends at least partially through the waterway body. The actuator is disposed at least partially within the waterway body and is configured to extend at least partially into the waterway restriction zone. The handshower cradle is movably coupled to the waterway body. The cradle is configured to receive a handshower and to engage with the actuator under the weight of the handshower to automatically adjust a position of the actuator with respect to the waterway body.

DETAILED DESCRIPTION

Figure 1:
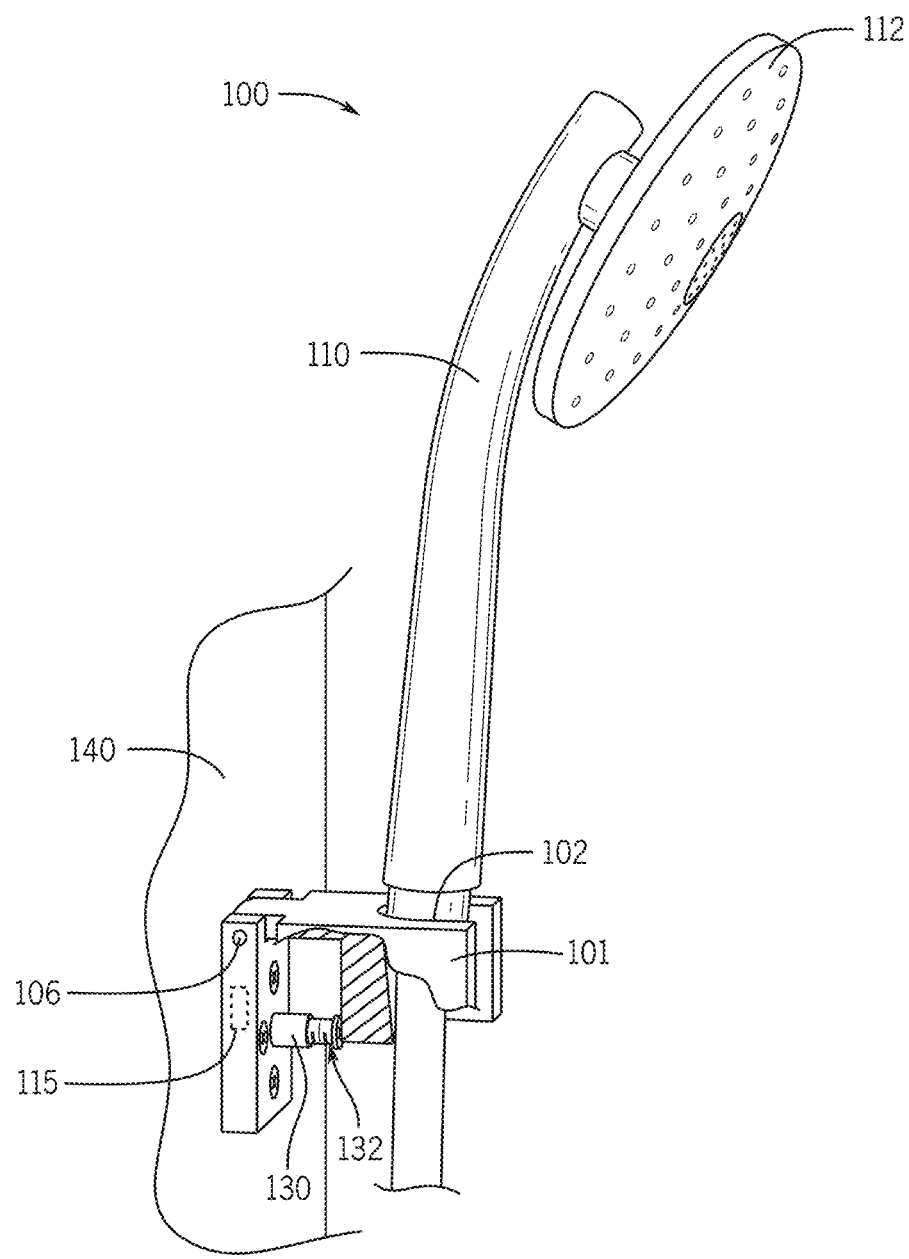
FIG. 1 is a perspective view of a handshower cradle assembly, according to an exemplary embodiment.
Figure 2:
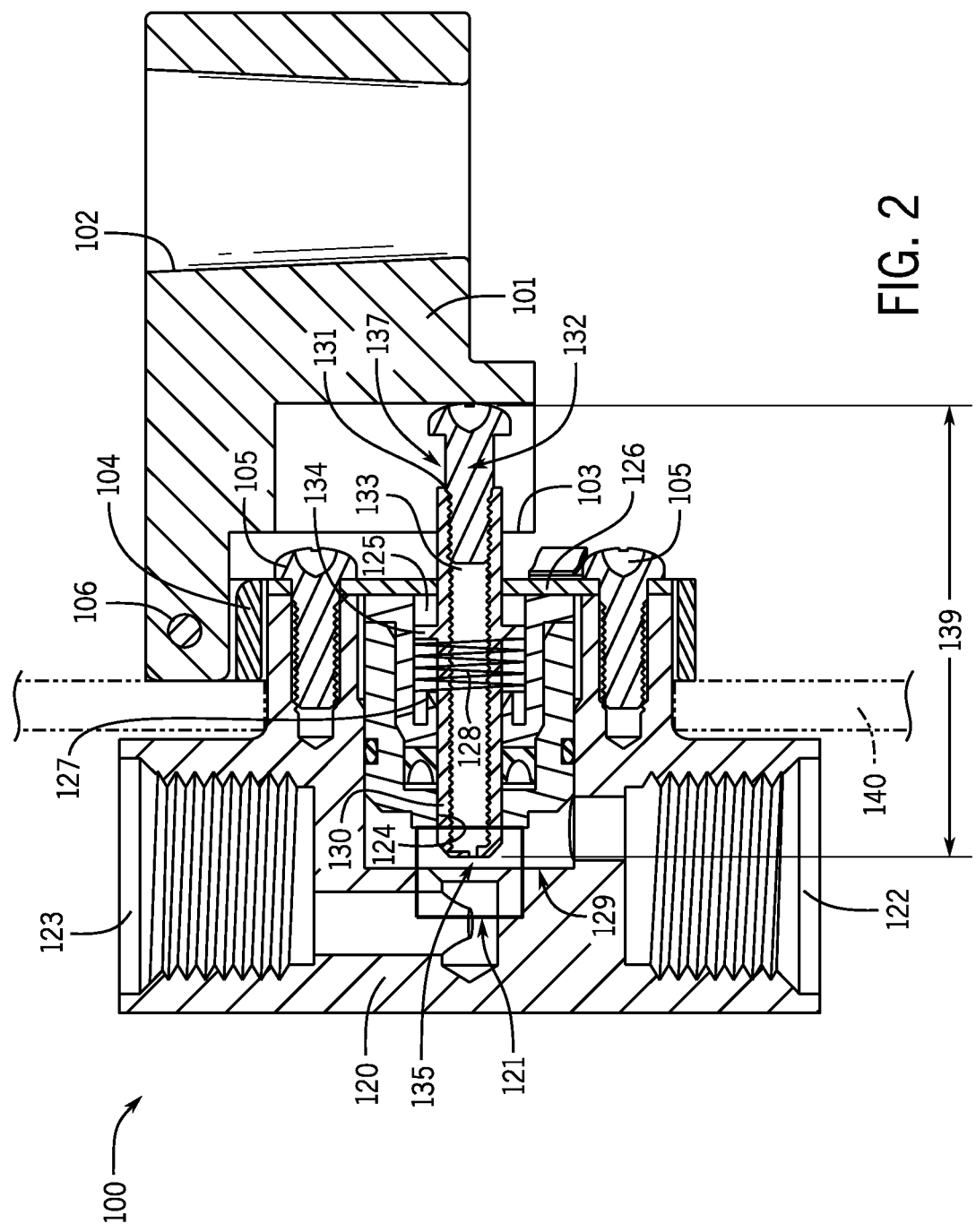
FIG. 2 is a cross-sectional view of the handshower cradle assembly of FIG. 1 without the handshower.

Turning now to FIGS. 1 and 2, a handshower cradle assembly 100 includes a handshower cradle 101 configured to removably receive a handshower 110 within a receiver 102, a waterway body 120 to which the cradle 101 pivotably couples, and an actuator (e.g., a mechanical interface, a plunger, etc.), shown as plunger 130, that is partially received within and can operably extend into the waterway body 120 to restrict the water flow that is provided to the handshower 110. Although the embodiments shown herein utilize a plunger (e.g., plunger 130) for the purpose of selectively restricting the flow of water, it should be understood that other structures may be used according to other exemplary embodiments, and all such modifications are intended to be encompassed herein. In other words, while a plunger configuration such as that shown herein is efficacious for the purpose of selectively restricting the flow of water, other mechanical structures, whether now known or hereafter developed, may be used in a similar manner.

The waterway body 120 may be exposed, or according to another exemplary embodiment, as shown in FIG. 2, may be disposed behind a wall 140. The waterway body 120 has a fluid flow path for the water between the water inlet 122 and the water outlet 123. Specifically, the waterway body 120 may include internal generally cylindrical portions (e.g., a sidewall 129) through which water may flow, defining a waterway restriction zone 121 that fluidly couples a water inlet 122 to a water outlet 123. The water inlet 122 may be threaded and is in fluid communication with a water supply source (not shown). Specifically, the water inlet 122 may be coupled to the water supply source (not shown) via an NPT pipe thread. However, according to other exemplary embodiments, the water inlet 122 may be coupled to the water supply source by way of, for example, a slip-fit connection. In this way, the water inlet 122 may be fixedly coupled to the water supply source. The water outlet 123 may be threaded to enable it to be coupled to the handshower 110 by way of a handshower hose 111 that is attached at a lower end of the handshower 110 (see also FIG. 1). In addition, the water outlet 123 may contain a check valve (not shown).

As shown in FIG. 2, the waterway restriction zone 121 includes an aperture 124 on an outer sidewall (e.g., sidewall 129) that is configured to receive a portion of the plunger 130. Specifically, the aperture 124 may be annular and may be sized similar to the cross section of the plunger 130 to allow the plunger 130 to extend horizontally into the waterway restriction zone 121. An inner end 135 of the plunger 130 may be tapered and received within the waterway restriction zone 121, while a distal end 137 of the plunger 130 extends outwardly from the waterway body 120 (e.g., beyond an outer surface of the waterway body 120 in a substantially perpendicular orientation relative to the outer surface). The plunger 130 may be configured to act as a trigger 131, such that it may removably interact with the handshower cradle 101 to automatically reduce a flow rate of water through the waterway body 120 in response to placing the handshower 110 in the docked position.

The plunger 130 is disposed at least partially within the waterway body 120 between the water inlet 122 and the water outlet 123. As shown in FIG. 2, the plunger 130 may be partially received within and extend though a cavity 125 formed by the waterway body 120 and a cap seal 126. The cavity 125 may be concentric to and larger than the plunger 130. The cavity 125 may have the aperture 124 at an inner end (e.g., a proximal end located within the wall 140) and the cap seal 126 at an outer end (e.g., a distal end located outside of the wall 140). The cavity 125 may also include a shoulder 127 on an inner end extending into the cavity 125, and a return spring 128, which may be concentric to and receive the plunger 130 within the cavity 125. The return spring 128 biases the plunger 130 away from (e.g., applies a force directed away from) the waterway restriction zone 121 (e.g., to the right as shown in FIG. 2, horizontally toward the cradle 101, etc.). The return spring 128 may be biased between the shoulder 127 and a flange 134 which extends radially outwardly from the plunger 130, such that the perimeter of the flange 134 may engage with the inner perimeter of the cavity 125. In some embodiments, the plunger 130 does not have a flange 134, and instead the return spring 128 may be biased between the shoulder 127 and the cap seal 126.

The cavity 125 extends through the wall 140, and couples to a base 104 of the handshower cradle 101 by way of fasteners 105 (e.g., screws or bolts, etc.). The fasteners 105 extend horizontally into the wall 140 and fixedly couple the base 104 to the waterway body 120 to provide support for the handshower cradle 101. The base 104 includes a pivot 106 at an upper end which pivotably couples to an inner end 103 of the cradle 101. In this way, when the cradle 101 is pivotably coupled to the pivot 106, the cradle 101 will rotate upward and downward about the pivot 106. When the cradle 101 is rotated downward (e.g., clockwise as shown in FIG. 2), it rotates toward the wall 140, and engages with the trigger 131 at the distal end of the plunger 130. When this occurs, the cradle 101 applies an inward force on the trigger 131 of the plunger 130, causing the plunger to translationally slide into the cavity 125 and the waterway restriction zone 121.

The cradle 101 is configured to receive the handshower 110 and to support the handshower 110 in a docked position within a shower enclosure (e.g., in a fixed position relative to wall 140). The cradle 101 includes a downward extending recess that acts as a receiver 102 for removably coupling the handshower 110 to the cradle 101. The receiver 102 is shown as being generally conical (i.e., cylindrical and taper downward) to receive a tapered lower end of the handshower 110, although it may have other configurations according to other exemplary embodiments, and may be complementary to the shape of a portion of the handshower that is to be received therein. The conical tapered end of a standard handshower hose 111 is the mating geometry generally needed to mate with the cradle 101. In other words, a previously installed handshower assembly may be retrofit with the handshower cradle assembly 100 so long as the existing handshower hose 111 and lower end of the handshower 110 has a conical tapered end with which the cradle 101 will couple. The receiver 102 may have an opening at the bottom and along a sidewall, so as to allow the handshower hose 111 to extend through the receiver 102. The handshower 110 may be considered docked when it is received within the receiver 102 of the cradle 101. Conversely, when a user removes the handshower 110 from the cradle 101 the handshower 110 may be considered undocked or removed from the cradle 101.

When the handshower 110 is docked or replaced in the cradle 101, the weight of the handshower 110 will cause the cradle 101 to pivot downward about the pivot 106. As the cradle 101 pivots downward, it engages with the trigger 131 of the plunger 130. The engagement force from the cradle 101 exerts an inward force on the trigger 131 and plunger 130 (e.g., an inward force directed toward the wall 140, right to left as shown in FIG. 2). This inward force causes the plunger 130 to translationally slide further through the cavity 125 and into the waterway restriction zone 121. While the plunger 130 slides inward, the return spring 128 is increasingly compressed between the shoulder 127 and the flange 134. While the return spring 128 does apply resisting force against the plunger 130 as it extends further into the cavity, the inward force of the cradle 101 may overcome it, causing the plunger 130 to continue to extend into the cavity 125 and waterway restriction zone 121. In some embodiments, the plunger 130 may extend into the waterway restriction zone 121 until it engages with the farthest sidewall 129 (e.g., a sidewall defining an inlet channel to the water outlet 123). When this occurs, the plunger 130 may effectively impede the entire flow path of water between the water inlet 122 and the water outlet 123, such that the waterway restriction zone 121 completely prevents any water from flowing to the water outlet 123 until the plunger 130 is removed.

When a user removes the handshower 110 from the cradle 101, the weight of the handshower 110 will be removed, which in turn removes the inward force applied to the trigger 131 by the cradle 101. As the inward force on the plunger 130 and trigger 131 is reduced, the force of the return spring 128 will overcome any remaining inward force exerted on the plunger 130 (e.g., due to the weight of the cradle 101). This resisting force of the return spring 128, coupled with the hydraulic pressure exerted on the plunger 130 from the flow of water within the waterway body 120, causes the plunger 130 to be forced outward from the waterway body 120 and the cavity 125. As the plunger is forced backward, farther out of the waterway body 120, the plunger 130 allows increasingly more water to pass through the waterway restriction zone 121. In other words, as the force from the cradle 101 is removed from the plunger 130, the plunger 130 impedes less of the water flow (e.g., the pressure drop across the restriction zone 121 is reduced), thus resulting in a higher water flow to the water outlet 123.

The plunger 130 includes an adjustment mechanism 132 at the distal end 137 thereof, which is configured to interact with the handshower cradle 101 and to allow a user to vary an amount of flow (e.g., a flow rate of water) that passes through the handshower 110 when the handshower 110 is in the docked position. For example, as shown in FIG. 2, the adjustment mechanism 132 can be an adjustment screw that is coupled to the distal end 137 of the plunger 130 by way of a threaded engagement. The adjustment mechanism 132 can be at least partially received within and threadably coupled to a threaded recess 133 in the distal end 137 of the plunger 130. Other adjustment mechanisms may be used according to other exemplary embodiments to achieve the same result. As shown in FIG. 2, an overall length 139 of the plunger mechanism is the combination of the length of the plunger 130 and the distance that the adjustment mechanism 132 extends from the end of the plunger 130. As the adjustment mechanism 132 is increasingly tightened, it is received deeper within the threaded recess 133 of the plunger 130, resulting in a distal end of the adjustment mechanism 132 (e.g., a head of the adjustment screw) being closer to the cap seal 126. In addition, as the adjustment mechanism 132 is tightened, the maximum amount of translational movement of the adjustment mechanism 132 into the restriction zone 121 is reduced, thereby increasing the flow rate of water through the waterway body 120 when the handshower 110 is received within the cradle 101 (e.g., in the docked position). In addition, because the adjustment mechanism 132 effectively acts as an adjustable trigger 131, it should be appreciated that any description of the operation and interaction of the trigger 131 may similarly apply to the adjustable mechanism 132 and vice versa.

Figure 3:
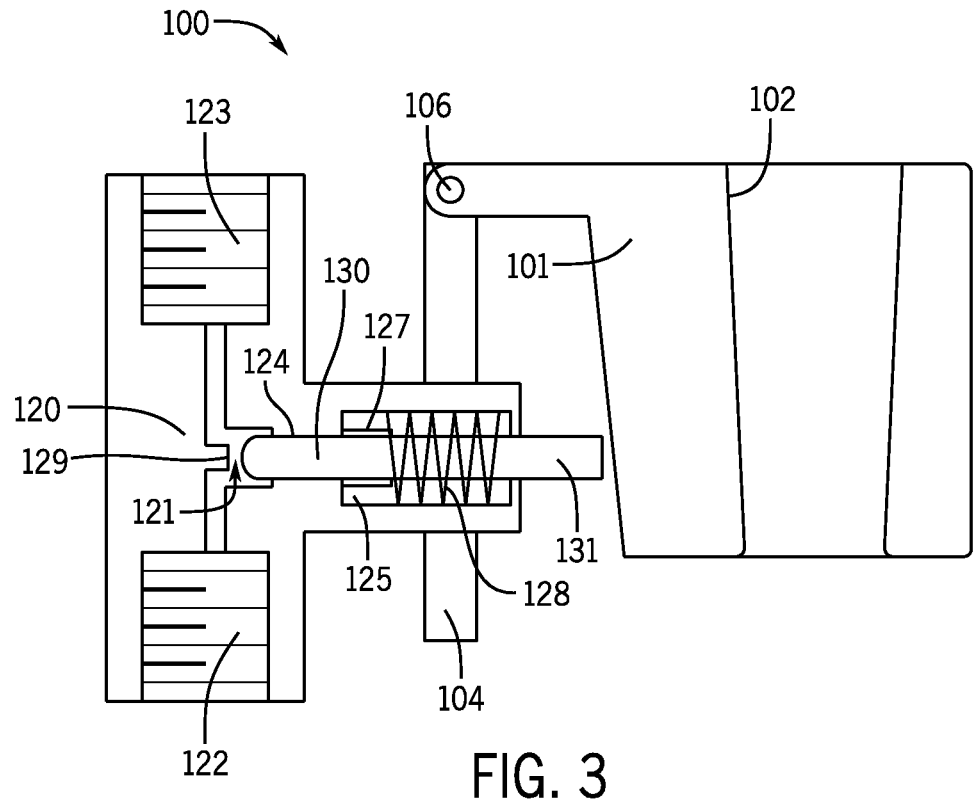
FIG. 3 is a schematic of a first configuration of a waterway body of a handshower cradle assembly, according to an exemplary embodiment.

Referring now to FIG. 3, in some embodiments, the waterway body 120 of the handshower cradle assembly 100 may be configured such that the water inlet 122 is disposed vertically below the water outlet 123, such that the water inlet 122 and water outlet 123 are generally vertically aligned. In this configuration, the waterway restriction zone 121 is disposed vertically between the water inlet 122 and the water outlet 123, such that in operation, water flows from the water source (not shown), and traverses vertically upward through the water inlet 122, into the waterway restriction zone 121, and to the water outlet 123, before being discharged out of the handshower 110. As illustrated, the aperture 124 that receives the plunger 130 is disposed in a sidewall of the waterway restriction zone 121, such that the plunger 130 is configured to extend radially inward into the waterway restriction zone 121 in a substantially perpendicular orientation relative to a flow direction through the waterway restriction zone 121 between the water inlet 122 and the water outlet 123.

In operation, upon the handshower 110 being docked within the cradle 101, the cradle 101 will rotate downward (e.g., clockwise as shown in FIG. 3) about pivot 106 until it engages with the trigger 131 of the plunger 130. The cradle 101 will then force the plunger 130 to extend through the cavity 125 and further horizontally into the waterway restriction zone 121 of the waterway body 120. The plunger 130 will extend into the waterway body 120 until the inner tapered end of the plunger 130 engages with the farthest sidewall of the waterway restriction zone 121. In the event that the user had the water turned on when the handshower 110 was docked, water would travel vertically from the water supply source (not shown), through the water inlet 122, and toward the water restriction zone 121. If the plunger 130 is engaged with (e.g., abutted against) the farthest sidewall of the waterway restriction zone 121, the plunger 130 may substantially or completely impede the flow of water through the water restriction zone 121 and to the water outlet 123. However, if the plunger 130 is merely received within the water restriction zone 121 but not blocking an entire flow path through the waterway restriction zone 121, then the flow rate of the water out of the handshower 110 may be only partially reduced. Accordingly, it should be appreciated that the more the plunger 130 impedes with the waterway restriction zone 121, the lower the flow rate of water out of the handshower 110 will be.

Figure 4:
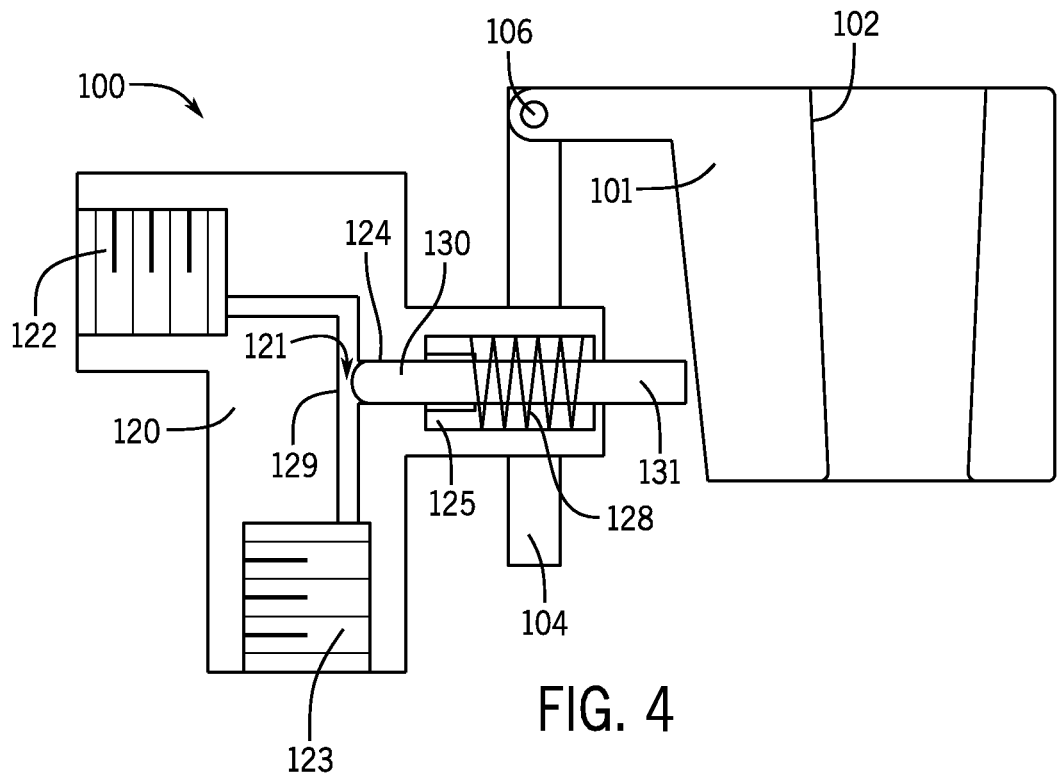
FIG. 4 is a schematic of another configuration of a waterway body of a handshower cradle assembly, according to an exemplary embodiment.

Referring now to FIG. 4, in some embodiments, the water inlet 122 may be oriented horizontally, and the water outlet 123 may be oriented vertically below the height of the water inlet 122 (e.g., the water outlet 123 may be arranged in a substantially perpendicular orientation relative to the water inlet 122). In this way, water may travel from the water supply source (not shown) to the water inlet 122, and continue through a horizontal flow portion fluidly coupled to the water inlet 122 before being redirected to a vertical portion that is fluidly connected to the water outlet 123. In other words, in this embodiment, the waterway body 120 is configured to redirect the flow of water between the water inlet 122 and the water outlet 123 by approximately 90°. In the exemplary embodiment of FIG. 4, the waterway restriction zone 121 may be disposed vertically above the water outlet 123 and horizontally offset from but vertically below the water inlet 122, such that in operation, water flow must pass the waterway restriction zone 121 in the vertical portion before being delivered to the water outlet 123. However, other than the difference in configuration of the waterway body 120 discussed above with respect to FIG. 4, the operation of the handshower cradle assembly 100 may operate in a similar manner to that which was described above with regard to FIGS. 2-3.

In operation, upon a user removing the handshower 110 from the cradle 101, the flow rate of the water through the handshower cradle assembly 100 to the handshower 110 is generally unimpeded, and may allow for the full flow-rating of the handshower 110. Subsequently docking the handshower 110 (i.e., placing the handshower 110 back in the cradle 101) will cause the handshower cradle assembly 100 to impede the flow of water to the handshower 110 either partially or completely, depending on how the adjustment mechanism is adjusted (or, where no adjustment mechanism is provided, on how the cradle assembly is configured). This may be accomplished in a variety of ways. For example, as described in detail above, the handshower cradle assembly 100 may be configured such that a pivoting or hinging motion of the cradle 110 will cause the cradle 101 to apply an inward force on the plunger 130, causing the plunger 130 to block the water flow path through the cradle 101. In addition, it is contemplated that in some embodiments, a telescopic or translational movement may be used to restrict a flow path of the water.

In some embodiments, when the user docks the handshower 110 onto the cradle 101, the weight of the handshower 110 causes the cradle 101 to pivot downward (e.g., clockwise as shown in any of FIGS. 2-4) about the pivot 106, such that the lower end of the cradle 101 is rotated towards the wall 140. The cradle 101 is configured to engage with and apply a force to the plunger 130 or adjustment mechanism 132 when tilted downward. The force exerted on the plunger 130 or adjustment mechanism 132 will cause the plunger 130 to linearly depress into the waterway body 120, so as to impede the water flow.

Upon removing the handshower 110 from the cradle 101, the downward force exerted on the cradle 101 due to the weight of the handshower 110 is removed, enabling the cradle 101 to rotate upward (e.g., in a counterclockwise direction as shown in FIGS. 2-4) back to an undocked position. As the cradle 101 rotates upward, the inward force exerted on the distal end 137 of the plunger 130 or adjustment mechanism 132 is reduced, allowing the plunger 130 to reset to an initial position due to the hydraulic pressure of the water flowing through the waterway restriction zone 121 and the outward force applied to the plunger 130 by the internal return spring 128. Alternately or additionally, a user may manually reset the handshower cradle assembly 100 to the full flow rate position by, for example, pulling the distal end 137 of the plunger 130 away from the wall 140.

Additionally, in some embodiments, other types of actuators may be utilized for flow control between the docked and undocked positions. For example, the handshower cradle assembly 100 may include an electronic switch and a controller operably coupled thereto. The controller may be configured to modify the flow rate through the waterway body 120 (e.g., by activating a proportional control valve, solenoid valve, or another electronic flow control mechanism to restrict or prevent flow through the waterway restriction zone 121) in response to a control signal from the electronic switch. The electronic switch may be a lever or button disposed on the waterway body 120 that engages with the cradle 101 and moves under the weight of the cradle 101. In other embodiments, the electronic switch may be a proximity/position sensor such as a capacitive sensor, a magnetic proximity sensor, or any other sensor type configured to generate a control signal in response to a position of the handshower 110 relative to the cradle 101 (rather relying on the weight of the handshower 110 to activate flow control).

The handshower cradle assembly 100 may optionally include a discrete button, knob, or another actuator to automatically control (e.g., reduce) the flow rate of water through the handshower cradle assembly 100 (e.g., the waterway body 120) in response to placing the handshower 110 in the docked position. The button or knob 115 may be disposed on a side of the waterway body 102 or another position to simplify manual manipulation by a user (rather than engaging the adjustment mechanism).

The flow rates or modes may also be selected by the user by interfacing with (e.g., manually manipulating) the adjustment mechanism. In some exemplary embodiments, rather than an adjustment screw that is used to adjust the flow rate of the water, the adjustment mechanism may instead be, for example, an adjustment pin or knob that the user interfaces with to both adjust the desired flow rate, and possibly also to adjust a spray mode of the handshower (e.g., to allow a user to selectively determine which jets of the handshower 110 are fluidly coupled to the water outlet 123, etc.). According to other exemplary embodiments, the adjustment mechanism may be omitted entirely (e.g., the water flow may be completely impeded when the handshower is docked, or may have a reduced water flow if configured in that manner).

As previously indicated, the handshower cradle assembly 100 may include an adjustment mechanism 132 (i.e., adjustment screw) which is fastened into a threaded end 133 of the plunger 130. The adjustment screw 132 can allow for varying how choked or reduced the water flow is when the handshower 110 is docked, by restricting the depth that the plunger 130 can extend into the waterway restriction zone 121. Therefore, advantageously, the user can adjust the adjustment mechanism 132 if they wish to simply reduce the water flow when the handshower 110 is docked, rather than completely suspending the water flow. It should also be noted that in this way, the user may adjust the adjustment mechanism 132 such that the water may flow at full flowing rate when the handshower 110 is docked.

In addition, in some embodiments the handshower cradle assembly 100 may include a lockout feature. The lockout feature may be designed to bypass the reduced flow rate or ceased water flow mode of the handshower cradle assembly 100 when the handshower 110 is docked. For example, the lockout feature may be a button, lever, or another user interface that the user may engage (e.g., manually manipulate) which may prevent the plunger 130 from impeding the flow of water in the waterway restriction zone 121 (e.g., which may prevent movement of the plunger 130). In other words, the user may engage the lockout feature to allow the user to dock the handshower 110 in the cradle 101 and the lockout feature will force the water to remain flowing at a full flow rate (unimpeded through the waterway restriction zone 121).

Referring now to FIGS. 5-9, various docking positions and resulting water flow rates of the handshower cradle assembly 100 are shown. More specifically, the water flow rate as a result of the position of the cradle 101 (i.e., whether the handshower 110 is docked or undocked) and the effects of the adjustment mechanism 132 are shown.

Figure 5:
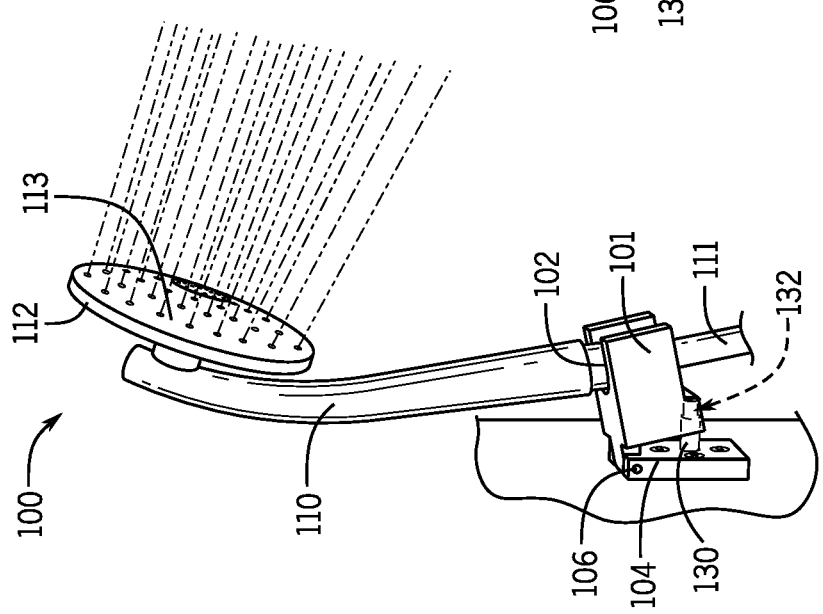
FIG. 5 is a perspective view of the handshower cradle assembly of FIG. 1, where the handshower is undocked and has a full water flow.

Referring now to FIG. 5, the operation of the handshower cradle assembly 100 is shown with the cradle 101 in an undocked position. The lower end of the handshower 110 is shown as being received within the receiver 102 of the cradle 101. As shown in FIG. 5, due to the user partially holding the handshower 110, the cradle 101 is spaced apart from the adjustment mechanism 132. However, the cradle 101 does not need to be spaced apart from the adjustment mechanism 132 to be considered in an undocked position for purposes of this application. Instead, as described above, the undocked position may also refer to the instance where the cradle 101 is engaging the adjustment mechanism 132, but is not applying a force sufficient to cause the plunger 130 to move into the waterway restriction zone 121. As illustrated in FIG. 5, with the cradle 101 in an undocked position, the cradle 101 is not engaging with the adjustment mechanism 132, which enables the full flow of water to traverse through the waterbody body 120 and out of the handshower 110, since the plunger 130 does not impede the flow of water through the handshower cradle assembly 100.

Figure 6:
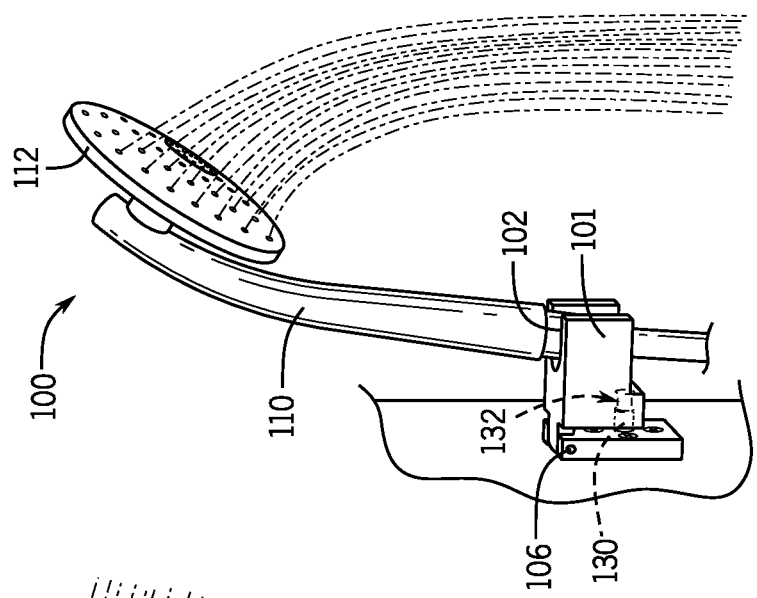
FIG. 6 is a perspective view of the handshower cradle assembly of FIG. 1, where the handshower is docked and has a reduced water flow.

Referring now to FIG. 6, the operation of the handshower cradle assembly 100 is shown with the cradle 101 in a docked position. In the exemplary embodiment of FIG. 6, the adjustment mechanism 132 has been adjusted to reduce the flow rate of the water but not to obstruct passage through the handshower cradle assembly 132 completely. Specifically, the handshower 110 is received within the receiver 102 of the cradle 101, causing the cradle 101 to pivot downward and exert a force on the adjustment mechanism 132. Here, the user has adjusted the adjustment mechanism 132 such that the plunger 130 is only partially impeding the waterway restriction zone 121. In other words, the adjustment mechanism 132, and resultantly, the plunger 130, has been adjusted such that it is in a position between completely impeding the waterway restriction zone 121 (i.e., ceasing water flow out of the handshower 110) and not impeding the waterway restriction zone 121 (i.e., allowing full water flow rate out of the handshower 110). In this way, with the cradle 101 in a docked position, and the adjustment mechanism 132 causes the plunger 130 to partially impede the waterway restriction zone 121, the water flow traverses from the water inlet 122 into the waterway restriction zone 121 where the flow rate is reduced, enabling a partial flow (e.g., a trickle) of water out of the handshower 110.

Figure 7:
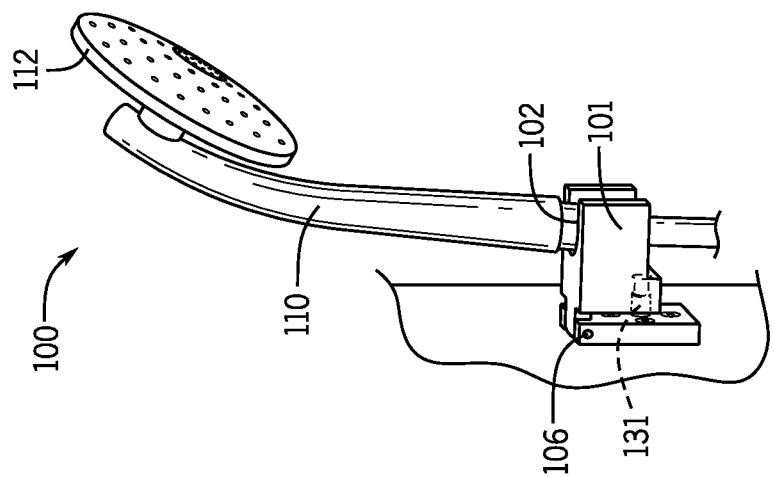
FIG. 7 is a perspective view of the handshower cradle assembly of FIG. 1, where the handshower is docked and water flow is suspended.

Referring now to FIG. 7, the operation of the handshower cradle assembly 100 is shown with the cradle 101 in a docked position. The handshower cradle assembly 100 is configured to completely obstruct the flow of water through the handshower cradle assembly 100. The plunger 130 may include a trigger 131 on the distal end that cannot be adjusted. Because the depth of the plunger 130 into the waterway body 120 cannot be adjusted, the plunger 130 horizontally extends into the waterway restriction zone 121 until the inner tapered end of the plunger 130 engages with the farthest sidewall of the waterway restriction zone 121. When this occurs, the plunger 130 completely impedes the flow of water from the water inlet 122 to the water outlet 123, and in turn causes the water flow to cease. In this way, with the cradle 101 in a docked position and the plunger 130 completely impeding the waterway restriction zone 121, the flow of water traverses from the water inlet 122 into the waterway restriction zone 121 and is unable to traverse to the water outlet 123, resulting in zero flow of water out of the showerhead 112 of the handshower 110.

Figure 9:
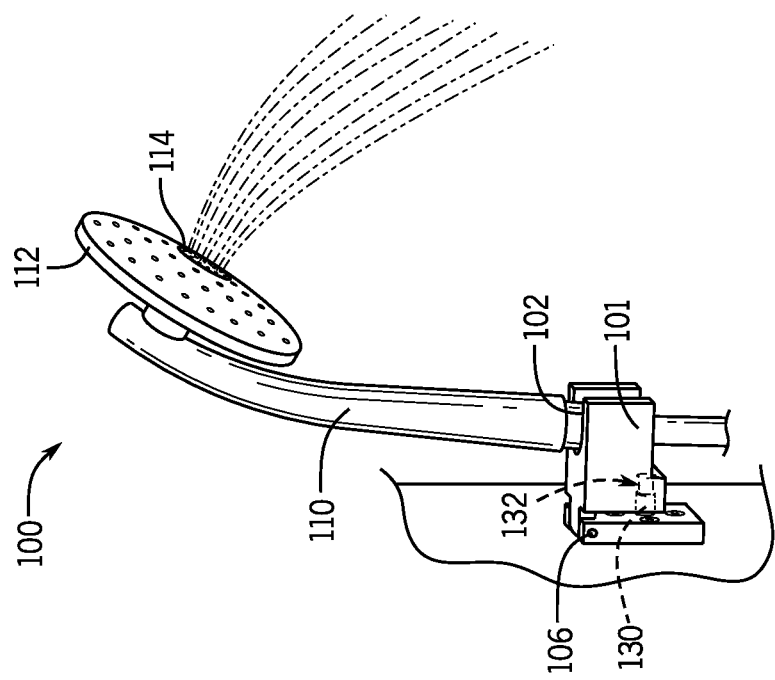
FIG. 9 is a perspective view of the handshower cradle assembly of FIG. 1, where the handshower is docked and has a reduced water flow.
Figure 8:
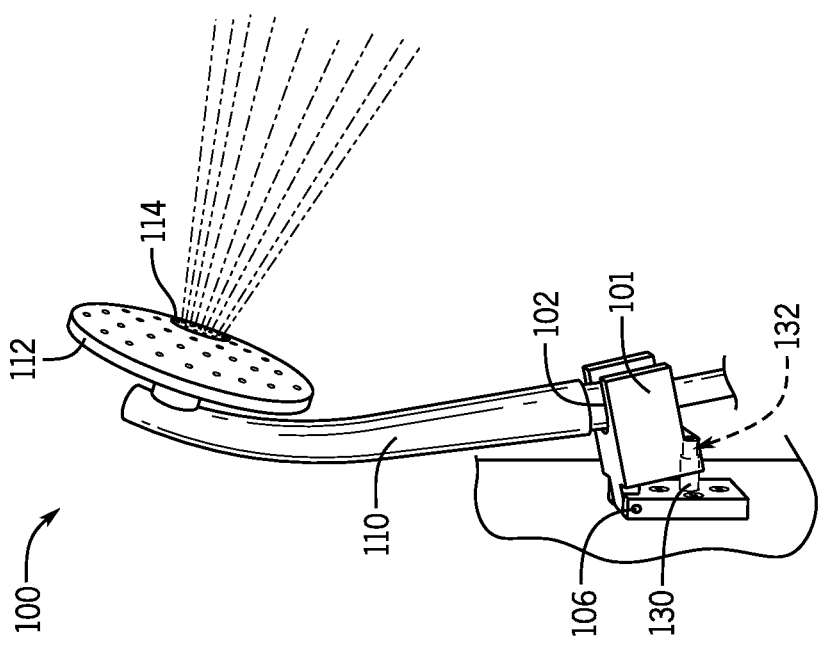
FIG. 8 is a perspective view of the handshower cradle assembly of FIG. 1, where the handshower is undocked and has a full water flow.

Referring now to FIGS. 8-9, an additional spray pattern of the handshower 110 is shown. Specifically, rather than a "shower spray," where water may discharge from the handshower 110 through a plurality of openings along the entire front face 113 of the showerhead 112 (as shown in FIGS. 5-7), in FIGS. 8-9, a different spray pattern is shown, in which water may discharge from the handshower 110 through a plurality of openings in a center periphery 114 of the front face 113 of the showerhead 112. However, besides the difference in spray pattern between FIGS. 5-7 and FIGS. 8-9, FIGS. 5-9 operate in largely the same way as described above. For example, as illustrated in FIG. 8, the operation of the handshower cradle assembly 100 is shown, where the cradle 101 is in an undocked position. The lower end of the handshower 110 is received within the receiver 102 of the cradle 101. Similar to FIG. 5, due to the user partially holding (i.e., supporting the weight of) the handshower 110, the cradle 101 is spaced apart from the adjustment mechanism 132. As illustrated in FIG. 8, with the cradle 101 in an undocked position, the cradle 101 is not engaging with the adjustment mechanism 132, which enables the full flow of water to traverse through the waterway body 120 and out of the plurality of openings in the center periphery 114 of the showerhead 112.

Referring now to FIG. 9, the operation of the handshower cradle assembly 100 is shown, where the cradle 101 is in a docked position and the adjustment mechanism 132 has been positioned to allow approximately the full flow rate of the water to discharge from the handshower 110. Specifically, the handshower 110 is received within the receiver 102 of the cradle 101, causing the cradle 101 to pivot downward about the pivot 106 and exert a force on the adjustment mechanism 132. However, because the adjustment mechanism 132 has been positioned such that the adjustment mechanism 132 does not transfer the full inward force exerted on the adjustment mechanism 132 to the plunger 130, the plunger 130 does not significantly impede with the waterway restriction zone 121. In other words, the adjustment mechanism 132, and resultantly, the plunger 130, has been adjusted such that it is in a position to prevent the plunger 130 from substantially reducing the water flow rate through the waterway restriction zone 121. In this way, with the cradle 101 in a docked position and the adjustment mechanism 132 preventing the plunger 130 from fully impeding the waterway restriction zone 121, the flow of water traverses through the waterway body 120 nearly unimpeded.

Beneficially, by reducing the flow rate of water while a bather is lathering, shaving, etc., users may reduce water consumption and save money. The savings achieved by the user may vary depending on user preferences, as the handshower cradle assembly is configured such that it may be adjusted to reduce flow anywhere from a minimal reduction in the flow rate of water to completely ceasing the flow of water out of the handshower. Such an application may be useful for the elderly or disabled, as well as a tool for bathing children or pets, as it would free the user's hands to instead have improved dexterity for the bathing task. In addition, because the water may continue to flow through the waterway body when the handshower is docked (albeit at a lower flow rate), the water may advantageously remain at a consistent temperature, rather than having to wait for the water to return to the desired temperature upon resuming a water flow. In addition, because the handshower cradle assembly is installed downstream of the shower valve, the water temperature may be maintained while the flow of water out of the handshower is ceased or varied.

The handshower cradle assembly is advantageously designed such that it may be used with an existing handshower hose assemblies regardless of the handshower shape. For example, because many handshower hose assemblies include hose cones that have a similarly tapered lower end, and the handshower hose connections are generally similarly threaded connections to the water outlet, an existing handshower may fit within the receiver of the handshower cradle, such that an existing handshower may be utilized with the handshower cradle assembly to allow for the reduction and adjusting of water flow rates.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the sprayers as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., base, spray head, spray face, control ring, nozzle assembly, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

What is claimed is:

1. A handshower cradle assembly, comprising:
   a waterway body;
   a handshower cradle coupled to the waterway body;
   an actuator coupled to the waterway body and configured to control a flow rate of water through the waterway body; and
   an adjustment mechanism configured to allow a user to vary the flow rate of water through the waterway body when the actuator is actuated under the weight of a handshower, wherein the handshower cradle is pivotably coupled to the waterway body at a location above the actuator.

2. A handshower cradle assembly, comprising:
   a waterway body;
   a handshower cradle coupled to the waterway body;
   an actuator coupled to the waterway body and configured to control a flow rate of water through the waterway body;
   an adjustment mechanism configured to allow a user to vary the flow rate of water through the waterway body when the actuator is actuated under the weight of a handshower; and
   one of a button or knob configured to control operation of the adjustment mechanism.

3. The handshower cradle assembly of claim 2, wherein the handshower cradle comprises a receiver and a base, wherein the base is coupled to the waterway body, wherein the base includes a pivot at first end of the base, and wherein the receiver is hingedly coupled to the base at the pivot.

4. The handshower cradle assembly of claim 2, wherein the waterway body comprises:
   a waterway restriction zone between an inlet and an outlet of the waterway body;
   a cap forming a front face of the waterway body; and
   a cavity disposed between the waterway restriction zone and the cap, wherein the actuator protrudes outwardly through the cap.

5. The handshower cradle assembly of claim 2, wherein the actuator comprises a plunger that is slidably engaged with the waterway body, and wherein an overall length of the plunger is based on a position of the adjustment mechanism.

6. The handshower cradle assembly of claim 2, wherein the actuator further comprises a plunger that is slidably engaged with the waterway body, wherein the plunger extends at least partially into a waterway restriction zone between an inlet and an outlet of the waterway body when the actuator is depressed under the weight of the handshower.

7. The handshower cradle assembly of claim 6, wherein the adjustment mechanism changes an amount of translational movement of the plunger under the weight of the handshower.

8. The handshower cradle assembly of claim 6, wherein the waterway restriction zone includes an aperture sized to receive an inner end of the plunger therein to reduce the flow rate of water through the waterway body.

9. A handshower cradle assembly, comprising:
   a waterway body having an inlet port and an outlet port that is fluidly coupled to the inlet port by a waterway restriction zone that extends at least partially through the waterway body;
   an actuator coupled to the waterway body and configured to allow a user to vary a flow rate of water through the waterway restriction zone;

an adjustment mechanism configured to adjust a position of the actuator under the weight of a handshower without disassembling the actuator or the waterway body; and one of a button or a knob configured to control operation of the adjustment mechanism.

10. The handshower cradle assembly of claim 9, further comprising a handshower cradle pivotably coupled to the waterway body.

11. The handshower cradle assembly of claim 9, further comprising a receiver and a base, wherein the base is coupled to the waterway body, wherein the base includes a pivot at first end of the base, and wherein the receiver is hingedly coupled to the base at the pivot.

12. The handshower cradle assembly of claim 9, wherein the actuator comprises a plunger that is slidably engaged with the waterway body.

13. The handshower cradle assembly of claim 12, wherein the plunger is moveable between a first position and a second position in which the plunger extends at least partially into the waterway restriction zone.

14. The handshower cradle assembly of claim 12, wherein the waterway restriction zone includes an aperture sized to receive an inner end of the plunger therein to reduce the flow rate of water through the waterway body.

15. A method comprising:
reducing, by an actuator, a flow rate of water to a first flow rate through a waterway body under the weight of a handshower placed into a handshower cradle;
adjusting the actuator in response to a user input; and
reducing, by the actuator, the flow rate of water to a second flow rate through the waterway body that is different from the first flow rate under the weight of the handshower placed into the handshower cradle.

16. The method of claim 15, wherein:
reducing the flow rate of water to the first flow rate includes moving a plunger disposed within the waterway body from a first position to a second position to impede the flow rate of water through the waterway body; and
reducing the flow rate of water to the second flow rate includes moving the plunger from the first position to a third position that is different from the second position.

17. The method of claim 15, further comprising:
receiving the handshower in a receiver of the handshower cradle; and
pivoting the receiver downward under the weight of the handshower so as to press a substantially planar surface of the receiver against the actuator.

18. The method of claim 17, wherein pivoting the receiver comprises rotating the receiver about a pivot that is disposed above the actuator.

* * * * *